(12) United States Patent
Hind et al.

(10) Patent No.: US 6,904,562 B1
(45) Date of Patent: Jun. 7, 2005

(54) MACHINE-ORIENTED EXTENSIBLE DOCUMENT REPRESENTATION AND INTERCHANGE NOTATION

(75) Inventors: John R. Hind, Raleigh, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/652,056

(22) Filed: Aug. 31, 2000

(51) Int. Cl.[7] .............................. G06F 3/00; G06F 9/00; G06F 17/00
(52) U.S. Cl. ...................... 715/515; 715/513; 707/101; 707/102
(58) Field of Search ................................ 715/515, 513; 707/101, 102

(56) References Cited

U.S. PATENT DOCUMENTS

| | | | | |
|---|---|---|---|---|
| 5,179,378 A | * | 1/1993 | Ranganathan et al. | 341/51 |
| 5,663,721 A | * | 9/1997 | Rossi | 341/51 |
| 6,209,124 B1 | * | 3/2001 | Vermeire et al. | 717/114 |
| 6,330,574 B1 | * | 12/2001 | Murashita | 715/513 |
| 6,430,624 B1 | * | 8/2002 | Jamtgaard et al. | 709/246 |
| 6,446,256 B1 | * | 9/2002 | Hyman et al. | 717/142 |
| 6,490,591 B1 | * | 12/2002 | Denbar et al. | 707/101 |
| 6,502,101 B1 | * | 12/2002 | Verprauskus et al. | 707/101 |
| 6,504,554 B1 | * | 1/2003 | Stone et al. | 345/760 |
| 6,593,944 B1 | * | 7/2003 | Nicolas et al. | 345/744 |
| 6,675,351 B1 | * | 1/2004 | Leduc | 715/503 |
| 6,697,805 B1 | * | 2/2004 | Choquier et al. | 707/10 |

OTHER PUBLICATIONS

The Apache Software Foundation, Xalan–Java Version 1.2.D01, Jul. 25, 2000.*
Jang, Hyunchul et al., An Effective Mechanism for Index Update in Structured Documents, Nov. 1999.*
Yamamoto, Yohei et al., On Indices for XML Documents with Namespaces, 1999.*
"SML: Simplifying XML", by Robert E. La Quey, pp. 1–5, published on XML.com Nov. 24, 1999, http://www.xml.com/print/ 1999/11/sml/index.html.

* cited by examiner

*Primary Examiner*—Joseph Feild
*Assistant Examiner*—N Hillery
(74) *Attorney, Agent, or Firm*—Myers, Bigel, Sibley & Sajovec, P.A.

(57) ABSTRACT

A machine-oriented notation for representation and interchange of extensible documents: a method, system, and computer program product for operating upon (e.g. parsing, and storing documents in) this notation. The notation, referred to herein as "mXML" for "machine-oriented XML", is designed to be more compact than the Extensible Markup Language (XML), while still conveying the content and semantics of the data and the structure of the document. Documents may be created directly in mXML. In general case, a document represented using mXML notation can be processed more efficiently than when using the existing human-friendly XML notation, requires less storage space, and has a lower transmission cost for data interchange. XML documents can be converted to mXML using techniques of the present invention, and vice versa. Techniques disclosed herein are also applicable to notations other than XML.

23 Claims, 10 Drawing Sheets

---

460

```
6(root_element;1,4;;)(level_one_element1;2,3;0.2.2.1,3.4.7.1;8,1)
(level_two_element11;;;9,1)(level_two_element12;;;10,1)
(level_one_element2;5;11.2.13.1,14.4.18.1;19,1)
(level_two_element21;;;20,1)id1name1ABCid2name2DE
```

```
<NAMES>
  <NAME>
    <LAST_NAME> 105
    Erwin
    </LAST_NAME> 110
    <FIRST_NAME>115
    Cody 120
    </FIRST_NAME> 125
    <MIDDLE_INITIAL />
  </NAME>
  <NAME>
    <LAST_NAME SUFFIX = "Jr."> 130
    Curtis 135
    </LAST_NAME>
    <FIRST_NAME>
    John
    </FIRST_NAME>
    <MIDDLE_INITIAL />
  </NAME>
</NAMES>
```

```
<root_element> 402
    <level_one_element1 id="1" name="1"> 410
        A
        <level_two_element11> B </level_two_element11> 412
        <level_two_element12> C </level_two_element12> 414
    </level_one_element1>
    <level_one_element2 id="2" name="2"> 420
        D
        <level_two_element21> E </level_two_element21> 422
    </level_one_element2>
</root_element>
```

6(root_element;1,4;;,)(level_one_element1;2,3;0.2.2.1,3.4.7.1;8,1)
(level_two_element11;;;9,1)(level_two_element12;;;;10,1)
(level_one_element2;5;11.2.13.1,14.4.18.1;19,1)
(level_two_element21;;;;20,1)id1name1ABCid2name2DE ← 480

460

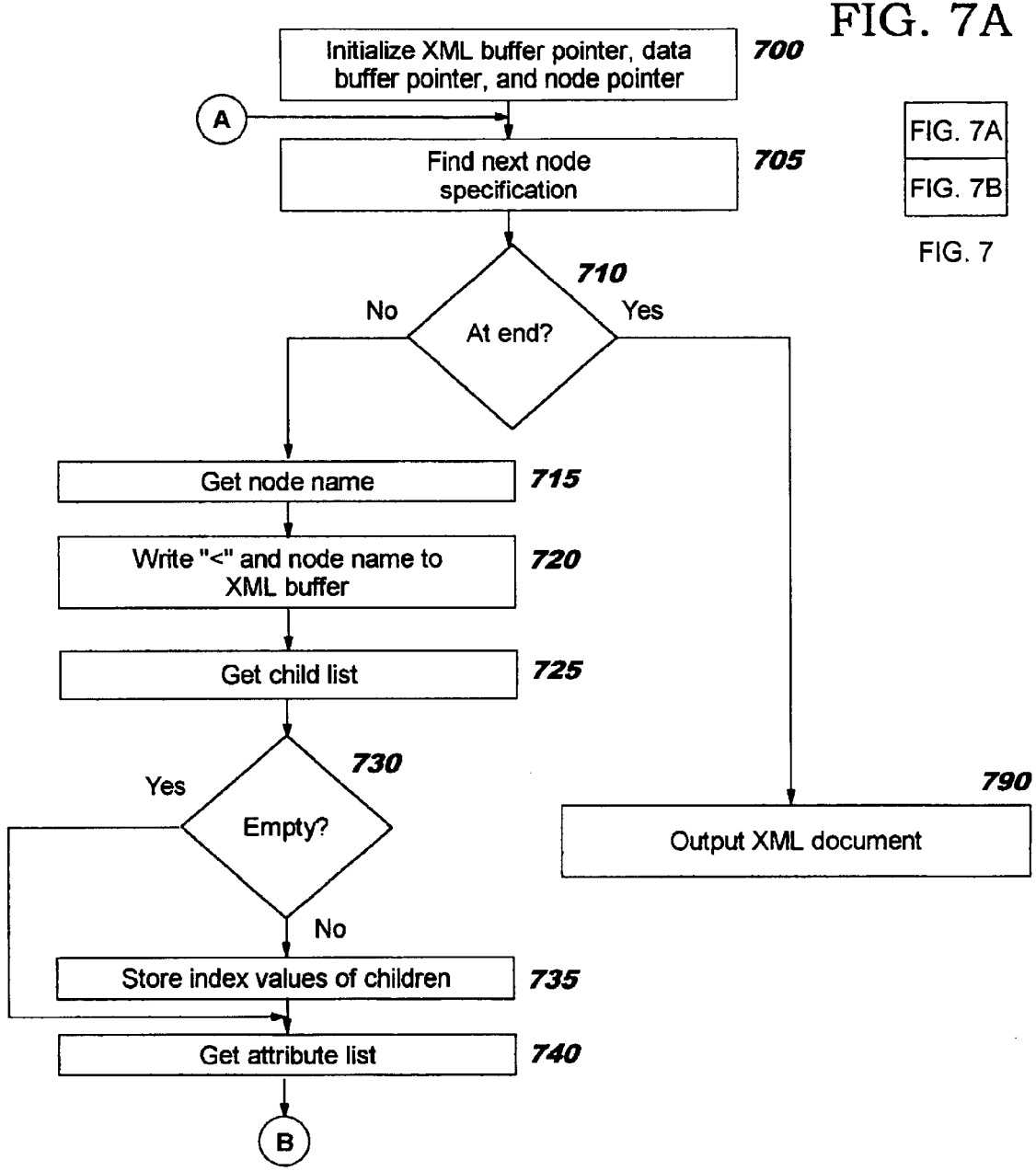

MACHINE-ORIENTED EXTENSIBLE DOCUMENT REPRESENTATION AND INTERCHANGE NOTATION

RELATED INVENTIONS

The present invention is related to pending U.S. patent application, titled "Array-Based Extensible Document Storage Format" (Ser. No. 09/652,296), referred to herein as the "first related invention", and pending U.S. patent application titled "High Performance Extensible Document Transformation" (Ser. No. 09/653,080), referred to herein as the "second related invention", both of which were filed concurrently herewith. These related inventions are commonly assigned to International Business Machines Corporation (IBM), and are hereby incorporated herein by reference.

BACKGROUND OF THE INVENTION

1. Field of the Invention

The present invention relates to a computer system, and deals more particularly with a machine-oriented notation for representation and interchange of extensible documents, as well as a method, system, and computer program product for operating upon (e.g. parsing, and storing documents in) this notation. The notation may be used as an alternative to the Extensible Markup Language (XML), capturing the same information in a more efficient manner.

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Others types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The Extensible Markup Language ("XML") is becoming the de facto standard format for representing and exchanging information in these environments. XML is a tag language, which is a language that uses specially-designated constructs referred to as "tags" to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags in XML, the syntax "<email>" could be used as a tag to indicate that the character string appearing in the data stream after this tag is to be treated as an e-mail address; the syntax "</email>" would then be inserted after the character string, to delimit where the e-mail character string ends.

The syntax of XML is extensible and flexible, and allows document developers to create tags to convey an explicit nested tree document structure (where the structure is determined from the relationship among the tags in a particular document). Furthermore, document developers can define their own tags which may have application-specific semantics. Because of this extensibility, XML documents may be used to specify many different types of information, for use in a virtually unlimited number of contexts. It is this extensibility and flexibility which is, in large part, responsible for the popularity of XML. (A number of XML derivative notations have been defined, and continue to be defined, for particular purposes. "VoiceXML" is an example of one such derivative. References herein to "XML" are intended to include XML derivatives and semantically similar notations such as derivatives of the Standard Generalized Markup Language, or "SGML", from which XML was derived. Refer to ISO 8879, "Standard Generalized Markup Language (SGML)", (1986) for more information on SGML. Refer to "Extensible Markup Language (XML), W3C Recommendation 10 Feb. 1998" which is available from the World Wide Web Consortium, or "W3C", for information on XML.)

Although XML is an excellent data format, the parsing, manipulation, and transformation of XML documents involves a considerable amount of overhead. FIG. 1 provides a simple example of prior-art XML syntax for a document 100 that may be used for specifying names (for example, names of the employees of a corporation, the customers of a business, etc.). In this example, a <LAST_NAME> tag pair 105, 110 is used to represent information for a last name, and a <FIRST_NAME> tag pair 115, 120 is used to represent information for a first name. The data content values for the last name and first name then appear (as a string, in this case) between the opening and closing tags. The <MIDDLE_INITIAL/> tag 125 in this case uses a short-hand empty tag format where the tag name of a tag having no data content is followed by a closing tag symbol "/>". XML tags may also contain attribute names and attribute values, as shown by the 'SUFFIX="Jr."' attribute 135 specified within the opening <LAST_NAME> tag 130. As can be seen upon inspection of this document 100, the entire data content of this example comprises 22 characters. The tag syntax, however, adds another 201 printable characters (not including tabs, line returns, blanks, etc.), or approximately 90 percent of the total document file size. In the general case, the overhead in terms of characters used for the tag syntax could be even higher, as the tag names might be even longer than those shown. In addition, the data content specified in this example as an attribute (shown at 135) could alternatively be represented as an element within its own opening and closing tag pair, leading to an even greater amount of tag-related overhead.

The extensible tag syntax enables an XML document to be easily human-readable, as the tag names can be designed to convey the semantic meaning of the associated data values and the overall relationship among the elements of the data. For example, in FIG. 1 the tag names and structure explicitly show that a name includes a last name, a first name, and a middle initial. This human-friendly, well-structured format enables a human being to quickly look through an arbitrary XML document and understand the data and its meaning. However, it will take a computer quite a lot of effort to understand the data and do useful things with it. The raw content of most XML documents will never be seen by a human: instead, what the end user sees is typically created using a rendering application (such as an XML parser within a browser) which strips out the tags and displays only the embedded data content. The added overhead of the human-friendly tag syntax therefore leads to unnecessary inefficiencies in processing and storing structured documents when the documents will only be "seen" by a computer program, such as for those documents which are formatted for interchange between computer programs for business-to-business ("B2B") or business-to-consumer ("B2C") use. This is especially true when the XML document is destined for processing on a high-volume transaction server, where none of the processing steps is likely to require a human to see or understand the document tags.

Accordingly, what is needed is a machine-oriented notation that improves the processing time for arbitrarily-structured documents and reduces the storage requirements and transmission costs of data interchange, while still retaining the extensibility and flexibility of XML and while conveying equivalent content and semantic information. Techniques for converting documents created in XML to this alternative notation, and optionally for converting from the alternative notation back to XML, are preferably provided to enable XML to be surfaced to humans in its current, human-friendly format if necessary.

SUMMARY OF THE INVENTION

An object of the present invention is to provide a machine-oriented notation for use as an XML alternative, where this machine-oriented notation improves the processing time for arbitrarily-structured documents and reduces the storage requirements and transmission costs of data interchange while still retaining the extensibility and flexibility of XML and while conveying equivalent content and semantic information.

It is another object of the present invention to provide a technique for converting documents created in XML to this alternative notation.

Another object of the present invention is to provide a technique for converting from the alternative notation back to XML.

It is also an object of the present invention to provide a notation which can be used to reduce the processing overhead, storage requirements, and/or transmission costs incurred when using XML or other similar notations.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a machine-oriented notation for representation and interchange of extensible documents, as well as a method, system, and computer program product for operating upon (e.g. parsing, and storing documents in) this notation. In the preferred embodiment, a document encoded in this notation resides on one or more computer-readable media and comprises: a node count representing a count of nodes in the document; a node specification for each of the nodes; and a data buffer containing attribute names and attribute values referenced from attribute lists (when present) and node values referenced from node value specifications. Each of the node specifications comprises: a node name; a child list specifying index values of zero or more nodes which are children of the node, optionally, an attribute list specifying zero or more (attribute name, attribute value) pair references for attributes of the node; and a node value specification, which is empty if the node has no value.

In one aspect, each (attribute name, attribute value) pair reference specifies a starting name position, a name length, a starting value position, and a value length. The sing name position and starting value position are preferably relative to a beginning of the data buffer or to a beginning of the document. In this aspect, the node value specification preferably specifies a starting value position and a value length, where this starting value position may be relative to a beginning of the data buffer or to a beginning of the document.

In another aspect, each (attribute name, attribute value) pair reference specifies a starting name position, an ending name position, a starting value position, and an ending value position. In this aspect, the node value specification preferably specifies a starting value position and an ending value position.

The present invention also provides a technique for encoding a document in an extensible machine-oriented structured notation, comprising: encoding a node count representing a count of nodes in the document; encoding a node specification for each of the nodes; encoding a data buffer containing attribute names and attribute values referenced from attribute lists (when present) and node values referenced from node value specifications; and storing the encoded node count, the encoded node specifications, and the encoded data buffer as the encoded document in memory or writing the encoded document to one or more storage media Encoding the node specifications further comprises: encoding a node name; encoding a child list specifying index values of zero or more nodes which are children of the node; optionally, encoding an attribute list specifying zero or more (attribute name, attribute value) pair references for attributes of the node; and encoding a node value specification, which is empty if the node has no value.

The present invention also provides a technique for processing a document encoded in an extensible machine-oriented structured notation, comprising: parsing the document and using the parsed document as input for the processing. Parsing the document further comprises: parsing a node count representing a count of nodes in the document; parsing a node specification for each of the nodes; and parsing a data buffer containing attribute names and attribute values referenced from the attribute lists and node values referenced from the node value specifications. Parsing the node specification further comprises: parsing a node name; parsing a child list specifying index values of zero or more nodes which are children of the node; parsing an attribute list specifying zero or more (attribute name, attribute value) pair references for attributes of the node; and parsing a node value specification, which is empty if the node has no value.

The present invention further provides a technique for converting an input document encoded in an extensible human-friendly extensible markup language ("XML") to an output document encoded in a machine-oriented extensible markup language ("mXML"), comprising: creating a document tree representation of the input document; obtaining a node count representing a count of nodes in the document tree representation; writing the node count to an mXML buffer; traversing each node in the document tree representation and generating a corresponding node specification in the mXML buffer; generating a data buffer containing attribute names and attribute values referenced from attribute lists and node values referenced from node value specifications; and appending the data buffer to the mXML buffer to form the output document. Traversing each node and generating the corresponding node specification further comprises: generating a node name; generating an attribute list specifying zero or more (attribute name, attribute value) pair references for attributes of the node; generating a child list specifying index values of zero or more nodes which are children of the node; and generating a node value specification, which is empty if the node has no value.

In one aspect of this technique, generating each (attribute name, attribute value) pair reference preferably further comprises generating a starting name position, a name length, a starting value position, and a value length. The starting name position and starting value position are preferably relative to a beginning of the data buffer, or to a beginning of the output document. Also in this technique, the node value specification preferably specifies a starting value position and a value length. This starting value position is preferably relative to a beginning of the data buffer or to a beginning of the document.

In another aspect of this technique, generating each (attribute name, attribute value) pair reference preferably further comprises generating a starting name position, an ending name position, a starting value position, and an ending value position. The node value specification may be specified as a starting value position and an ending value position.

The present invention will now be described with reference to the following drawings, in which like reference numbers denote the same element throughout.

BRIEF DESCRIPTION OF THE DRAWINGS

FIG. 1 illustrates a simple example of an XML document using the XML notation of the prior art;

FIGS. 4A through 4C illustrate a simple structured document created in existing XML notation, a tree structure representing the structure and data content of this prior art XML document, and an equivalent structured document represented in mXML notation according to a preferred embodiment of the present invention, respectively;

DESCRIPTION OF THE PREFERRED EMBODIMENT

Figure 2:
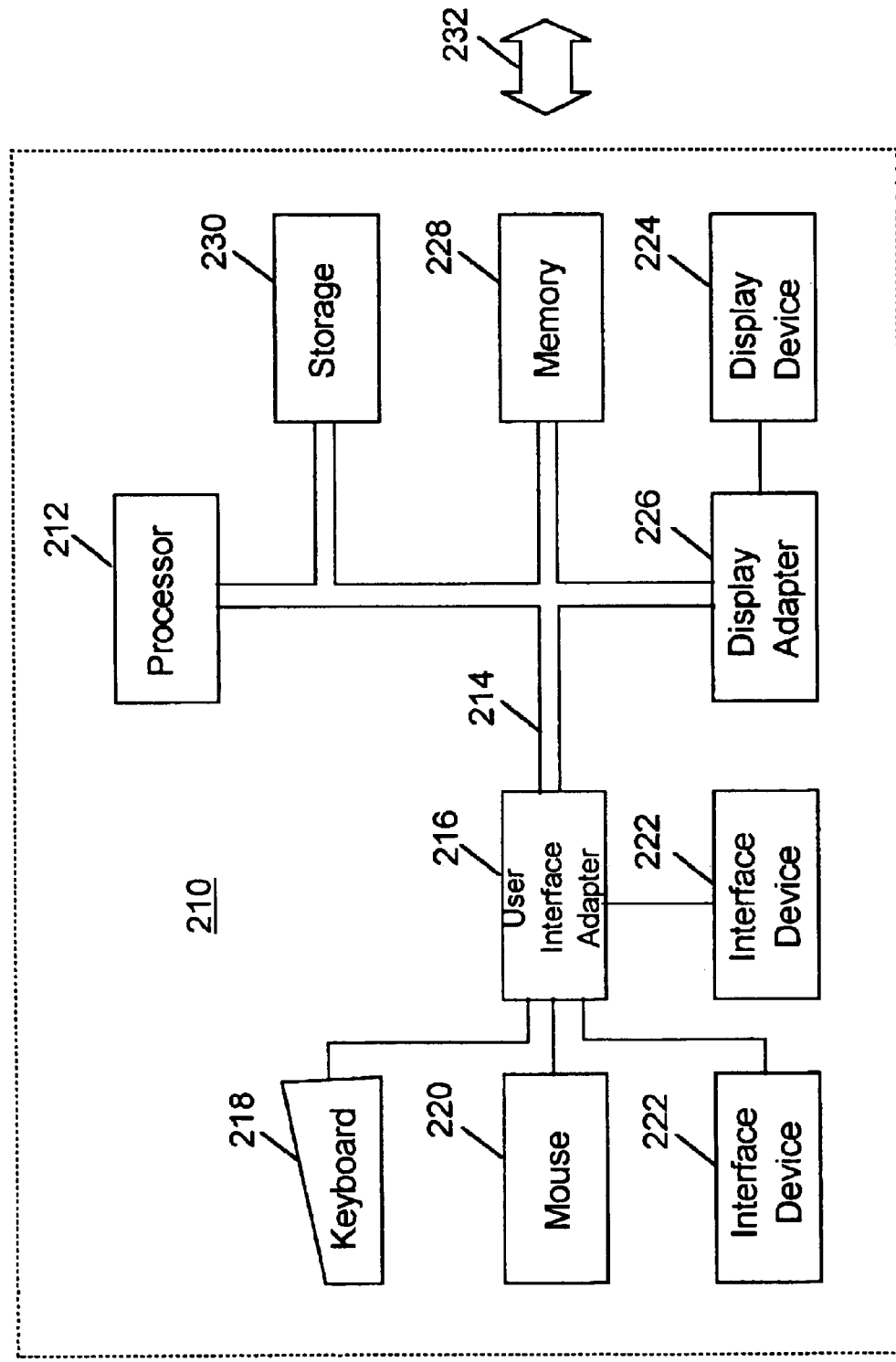
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a LAN or a wide area network (WAN), or the workstation 210 can be a client in a client/server arrangement with another computer, etc. All of these configurations, as well as the appropriate communications hardware and software, are known in the art.

The present invention may operate on a server or mainframe (referred to hereinafter as a server, for ease of reference), rather than on a workstation. The hardware environment of a server is well known in the art. Or, the present invention may operate on other computing devices such as personal digital assistants (PDAs), portable computing devices, etc. The documents created through use of the present invention may be stored on permanent or removable storage media used by a computing device, and/or may be transmitted between such a device and a server, or between a server and another server, where these types of devices may be connected by a network.

Figure 3:
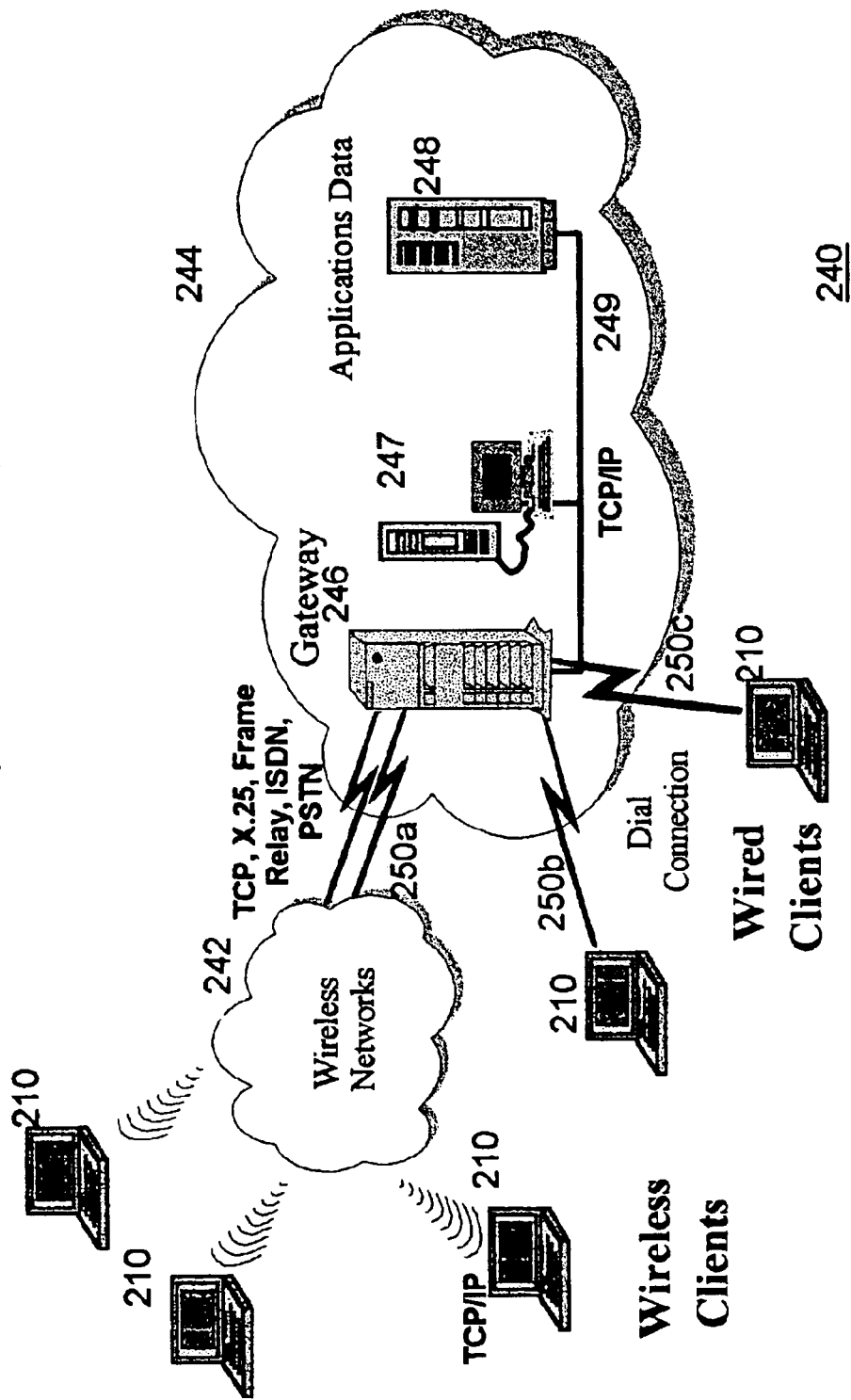
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 242 and 244 may also include mainframe computers or servers, such as a gateway computer 246 or application server 247 (which may access a data repository 248). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, 250c. The gateway computer 246 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 246 may also be coupled 249 to a storage device (such as data repository 248). Further, the gateway 246 may be directly or indirectly coupled to one or more workstations 210, and servers such as gateway 246 and application server 247 may be coupled to other servers such as server 243.

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in New York. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 (for example, of the workstation 210, server 243, gateway 246, and/or server 247) from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

The present invention may be used on a client computer or server in a networking environment, or on a standalone workstation (for example, to prepare a file or to process a file which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

In the preferred embodiment, the present invention is implemented in computer software. The implementation of this software may operate as one or more modules (also referred to as code subroutines, or "objects" in object-oriented programming) of one or more computer programs.

The present invention provides a machine-oriented notation for structured data representation and interchange that may be used as an alternative to XML. The notation is designed to be significantly more compact than XML, while still conveying the content and semantics of the data and the structure of the document in a manner that is equivalent to existing XML. Thus, the mXML notation benefits from the same extensibility and flexibility which are key to the wide acceptance of XML. With more and more application programs being written to operate upon XML documents, the improvements yielded by the m L notation will have a significant impact. An existing XML document may be converted to this machine-oriented notation, which is referred to herein as "mXML" for "machine-oriented XML". Or, documents may be created directly in mXML as an alternative to creation in XML. In the general case, a document represented using the mXML notation can be processed much more efficiently than when using the existing human-friendly XML notation, requires much less storage space, and has a significantly lower transmission cost for data interchange (for example, from one computing device to another across a network). XML documents can be converted to mXML using techniques of the present invention, as will be described in more detail herein. For those cases where it is necessary or desirable for a human to see the document in the human-friendly form (for example, for directly editing the document from its source file), a document represented in mXML can be easily converted to XML using techniques of the present invention.

The present invention also provides a method, system, and computer program product for operating upon (e.g parsing, and storing documents in) this notation. The present invention also defines a technique for converting existing XML documents to mXML, and for converting mXML documents to XML.

The preferred embodiment of the present invention will now be described in more detail with reference to FIGS. 4 through 7.

Figure 4B:
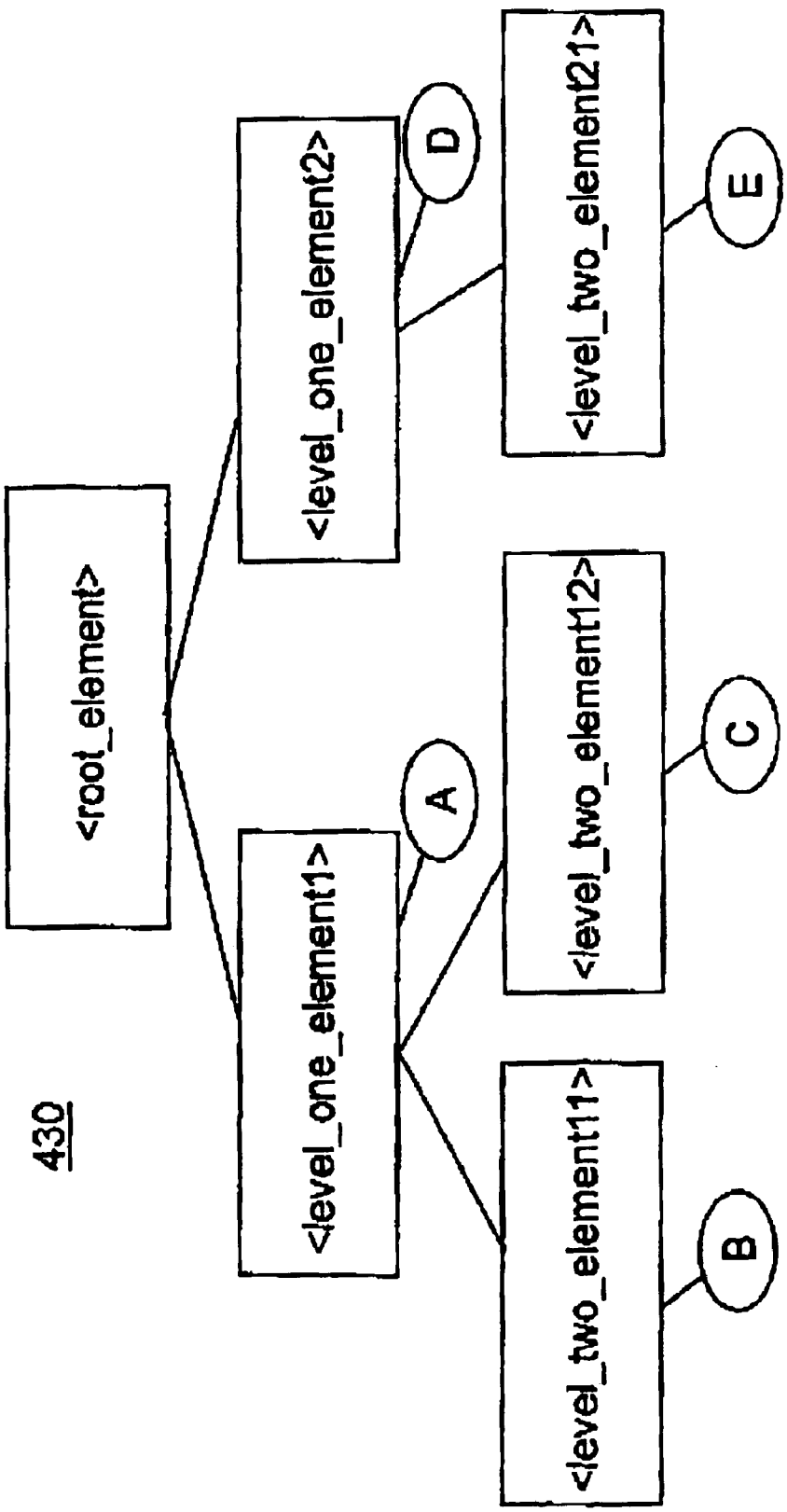

FIG. 4A illustrates a simple structured document 400 which is in the existing XML notation. This document contains 6 elements which are organized in a 3-level hierarchy. The node having element name "root_element" 402 is the root node, being at the highest level of the hierarchy. This node has 2 child nodes, having element names "level_ one_element1" 410 and "level_one_element2" 420. Node "level_one_element1" 410 also has 2 child nodes which are the nodes having element names "level_two_ element11" 412 and "level_two_element12" 414, and node "level_one_element2" 420 has a single child node having element name "level_two_element21" 422. A tree structure 430 representing document 400 is shown in FIG. 4B, where the tags for the 6 elements are depicted inside rectangular shapes representing nodes of the tree and the data context corresponding to each node is shown inside an ellipse. This interpretation of an XML document 400 and its corresponding tree structure 430 are well known in the art.

FIG. 4C illustrates a structured document 460 using a preferred embodiment of the syntax of the mXML notation, representing the same information as XML document 400 of FIG. 4A (and having the same tree structure as that shown at 430 in FIG. 4B). This mXML document 460 uses 216 characters, whereas the equivalent XML document 400 uses 273 characters. (In addition, it should be noted that XML document 400 also includes approximately 23 additional non-printing characters (such as spaces, tabs, and line returns), for a total of 296 characters.) There may be isolated instances where use of mXML will increase the number of bytes required to store a structured document, as compared to the existing XML notation. However, this increase in character count is expected to be extremely rare in actual practice, and will occur only when tag names are extremely short. It is therefore expected that the majority of XML documents will require less space when represented in mXML.

The mXML notation is designed to represent an XML document in such a way that a computer can quickly and efficiently scan through the document, and can also manipulate it efficiently. Documents may therefore be created directly in, and used in, their mXML format. On the rare occasions when a human must see the document in a human-friendly form (for manual editing or other purposes, for example), a relatively small amount of overhead will be incurred to perform a conversion from mXML to XML. Documents which have been created in the existing XML syntax may be more efficiently processed and/or stored by converting them to mXML.

The preferred embodiment of the mXML notation, as described herein, has been designed with the following considerations:

1) The data content is separated from the document structure, rather than being intermingled within the structure as in the existing XML notation. In the example of FIG. 4, the data content comprises the element values A, B, C, D, and E; the attribute names "id" and "name" (for the element shown at 410), and "id" and "name" (for the element shown at 420); and the corresponding attribute values 1, 1, 2, and 2. FIG. 4A shows how this information is located throughout the XML document 400 in the prior art. In FIG. 4C, on the other hand, these values are stored at the end of the mXML document, beginning at the position indicated with reference number 480. When a parser operates on a document (such as document 400 or 460), it is interested primarily in the document structure. The processing of the data content in an mXML document can therefore be delayed to the time when it is needed, and thus the separation of data structure and data content which is provided in mXML enables parsers to operate more efficiently.

2) The document tree structure is stored explicitly in the document when using mXML, rather than requiring the parser to deduce the document structure using look-ahead techniques as is required when XML tags of the prior art are parsed. Thus, a parser operating on an mXML document does not need to learn how to construct the document tree, and a number of compute-intensive operations can therefore be eliminated. Instead, the mXML parser merely scans the mXML document and rebuilds the tree according to the explicit, already-stored information (as will be described in more detail below).

3) Important information which is required for operation of the mXML parser is stored in advance within the mXML document, so that the parser can minimize its memory operations when constructing a corresponding document tree. In particular, the node count is precomputed and stored in the mXML document. According to the preferred embodiment of the mXML notation, this value is stored at the beginning of an mXML document. (In an alternative embodiment, the size of the data content is also precomputed and explicitly stored. In addition or instead, the starting location within the document of the data buffer may be explicitly stored if desired, enabling direct access to the data buffer without requiring additional processing such as the backward scanning process described below with reference to FIG. 5.) Thus, the parser can allocate most of the memory it needs at the beginning of its operation, thereby reducing the number of computationally expensive memory allocation (and de-allocation) operations it must perform. Furthermore, the high cost of garbage collection operations that occur when memory is being allocated and de-allocated frequently can be minimize.

A preferred syntax for mXML will now be described. It will be obvious to one of ordinary skill in the art, however, that alterations may be made to this preferred syntax without deviating from the inventive concepts disclosed herein. Several examples of such alterations will be described.

As has been stated, an mXML document preferably begins with an integer count of the number of nodes or, equivalently, the number of tag names which are represented in the document. When converting an XML document into mXML, this count is easily determined by scanning for occurrence of the opening tag syntax.

Preferably, the node count does not include opening comment tags, and comment text is preferably discarded during such a conversion as the comments are generally not useful for the machine to which an mXML document is targeted. Other tags which are significant, on the other hand, such as a tag which identifies the Document Type Definition ("DTD") to be used for a particular document, may be included in the mXML notation by searching for appropriate keywords in such tags and preserving the located comment during a conversion from XML to mXML. A preferred technique for handling tags of this type is described in more detail below, prior to the discussion of FIG. 5.

In the alternative embodiment where the data size is also explicitly stored in the document, this integer value preferably follows the node count, using a suitable delimiter such as a semi-colon. The integer data count in this alternative embodiment preferably includes the number of characters in each attribute name and each attribute value, and in each node's data value, as these items are all stored as the document's data buffer area (i.e. the end of the mXML document).

One or more node specifications follows the node count. Each node specification is preferably enclosed in opening and closing delimiters, such as the parentheses which are used in the preferred embodiment. (Thus, it is not necessary to follow the node count with a separate delimiter.) Alternatively, another syntax could be used for opening and closing delimiters, such as opening and closing square brackets. Preferably, no spaces occur between the delimiters or tokens used in mXML, as shown in FIG. 4C. This enables minimizing the storage and transmission requirements. Thus, the node count is immediately followed by the first delimiting open parenthesis, which is immediately followed by the first node name, and so forth.

The elements contained within a node specification according to the preferred embodiment of the mXML syntax will now be described. It should be noted that the order of these elements may be altered without deviating from the inventive concepts disclosed herein.

The node specification of the preferred embodiment begins by explicitly recording the node name (i.e. its tag value). This name is then followed by a delimiter, which is a semi-colon in the preferred embodiment. A list of the node's child nodes follows this delimiter, and this child list is then followed by another occurrence of the delimiter and a list of the node's attribute information. The attribute information is followed by the delimiter, which is followed by information that enables locating the node's data content. (Alternatively, the meaning of the delimiters used in the preferred embodiment can be changed, for example by using a comma in place of the semi-colon delimiters of the preferred embodiment and vice versa.)

The information in the node specification will now be described in more detail with reference to the example of FIG. 4. The node shown at 402 of FIG. 4A has 2 child nodes, shown at 410 and 420. The node shown at 410 is the second of the 6 nodes of the example, and the node shown at 420 is the fifth node. The preferred embodiment uses zero-based counting (except for the node count which has been described), and thus the child list for the node shown at 402 is specified using the syntax "1,4" (referring to the 2nd and 5th nodes) to indicate the relative position of this node's children within the overall tag sequence. The node shown at 410 has 2 child nodes, shown at 412 and 414, which are the third and fourth nodes in the XML document. The child list for the node shown at 410 is therefore specified as "2,3". If a node has more than 2 children, the child nodes are specified in the order they appear in the document and are separated the preferred embodiment) with commas. If a node has no children, as is the case with the node shown at 412, for example, then its child list is empty and the absence of children is indicated by the presence of 2 semi-colons in a row immediately following the node name.

The information for each attribute in the attribute list is also preferably delimited using a comma. Within each attribute's information, a period is preferably used as a delimiter. Referring to the example in FIG. 4A, node 410 has 2 attributes. The first has the attribute name "id" and the attribute value "1". Thus, the length of the attribute name is 2, and the length of the attribute value is 1. Again using zero-based counting, the first attribute represented in the attribute list for the node shown at 410 is therefore specified as "0.2.2.1", meaning that the name of the attribute is found in the data but starting at position 0 for a length of 2 characters, and the value is found starting at position 2 for a length of 1. As shown in FIG. 4C (see reference number 480), the data is preferably stored at the end of the mXML document. A parser can therefore avoid scanning these characters during the parsing the process when they are not needed.

The second attribute of node 410 in this example has the name "name" and the value "1". The information for this second attribute is therefore specified using the syntax "3.4.7.1", meaning that the attribute's name is found in the data buffer starting at position 3 for a length of 4 characters and its value is found starting at position 7 for a length of 1. If a node has more than 2 attributes, this dot-delimited syntax is used for each such attribute, and is separated from the other attribute specifications for this node using commas as delimiters. As with the child list syntax, if a node has no attributes, the absence is indicated by specifying an empty attribute list.

While the syntax used in the preferred embodiment refers to the data buffer using starting positions and length values, as described for the attribute names and values of the node at 412, in an alternative syntax the starting and ending positions within the data buffer may be used. Thus, the specification for the first attribute of the node at 412 would be expressed as "0.1.2.2", meaning hat the attribute name begins at position 0 and ends at position 1, and the attribute value begins and ends at position 2. Similarly, the specification for the second attribute would be expressed as "3.6.7.7". Use of length values, as selected for the syntax of the preferred embodiment, will in general require slightly less space than use of ending positions.

The final entry in each node specification is the location of the node's data in the data buffer. As with the other entries which refer to the data buffer, this location is preferably specified as a starting position and a length (but may be specified as a starting and an ending position, in an alternative embodiment), where the positions are specified as integer values. The integers are preferably separated by commas, and use zero-based counting. If a node has no data, as in the case of the node at 402 in the example, then this final entry is left empty. The node at 410 has a single-character data value in this example, and thus the final entry in this node's node specification is "8,1". As shown by the example syntax in FIG. 4C, the attribute names and values are preferably intermingled in the mXML data buffer along with the data content of the nodes.

Finally, the node specification for the last node (the node at 422, in the example of FIG. 4C) is immediately followed by the contents of the data buffer. Because integer pointer values specify where each data item begins in this data buffer and its length, as described above, it is not necessary to use white space or other delimiters in the data buffer.

Rather than specifying starting locations in terms of their offset from the start of the data buffer, they may alternatively be specified as offsets from the start of the mXML document. This approach requires slightly more space, however, and requires that the data buffer offsets are recomputed each time the structural information increases or decreases in length.

Thus, it can be seen that the structure of an mXML document is explicitly specified within the document. This information can be used to build a Document Object Model ("DOM") tree, if desired. The DOM tree can then be processed as in the prior art. Alternatively, the mXML document notation can be traversed directly, for example to locate information about a particular node, to determine the overall structure of the document, or to otherwise operate upon the mXML document. The mXML document may be stored using the array-based extensible document storage format describes in the first related invention, resulting in further processing efficiencies (as described therein) when operating on a document, (DOM is published as a Recommendation of the World Wide Web Consortium ("W3C"), titled "Document Object Model (DOM) Level 1 Specification, Version 1.0" (1998), which is available from the W3C.)

As examples of operations that may be performed directly on an mXML document, or from its array-based representation, it may be necessary to determine a node's children or perhaps its parent. The technique for explicitly specifying each node's children using a child list within an mXML document has been described above. A node's parent can be easily determined by traversing the child lists using the target node's sequence number. Suppose, for example, that it is necessary to determine the parent of the node at 414. This node is the fourth node encountered in the node specifications of FIG. 4C, which corresponds to sequence number 3 when using zero-based counting. By locating the node specification which includes this sequence number in its child list, it can be seen that the node at 410 is the parent of the node at 414 (and also that the node at 414 is the second of 2 children).

The XML notation includes a number of notational elements which are not strictly necessary for data-centered document specification. An XML subset referred to as "SML", for "Simple Markup Language", is currently under discussion in the technical community. This XML subset proposes use of a core set of XML syntax, and omission of features including attributes, processing instructions, etc. See, for example, a Web-published article entitled "SML: Simplifying XML", which was written by Robert E. La Quey and published Nov. 24, 1999. The preferred mXML syntax which is described herein provides support for one core set of XML notational elements (although not identical to the core set proposed for SML), where the basic node types include elements and attributes. More complicated XML documents containing additional node types can be supported by extending this preferred mXML syntax, where those additional node types include comments, processing instructions, CDATA, entity, entity reference, and document type nodes. In a preferred technique for specifying this extended mXML syntax, "text" nodes are added to an mXML document to refer to the actual node content. A node specification for a node type such as those just listed preferably occurs in-line within the mXML document, in the same relative location where it appears in a corresponding XML document. This node specification preferably comprises a null value in place of the node name; a list pointing to one or more child nodes, as is used in the node specifications which have been described, except that the children are now text nodes; an empty attribute list; and a pair of special indicators as the node value specification. The starting position entry within the special indicator pair is used to denote which type of other node is being represented. For example, a value of −2 may represent a comment, while a value of −3 represent a processing instruction, and so forth. The length entry within the special indicator pair is preferably set to −1. The node specification for each of the child text nodes referenced from the special child list preferably also uses a null name, and a null child list and attribute list. The value entry in this child text mode then (1) points to a location within the data buffer where the node's content is stored (preferably as a character string representing all the significant content from the source node), and (2) stores the length of this content.

Furthermore, the SML syntax can be represented using an alternative embodiment of the present invention wherein the attribute information described for the preferred embodiment of mXML is omitted.

Figure 5:
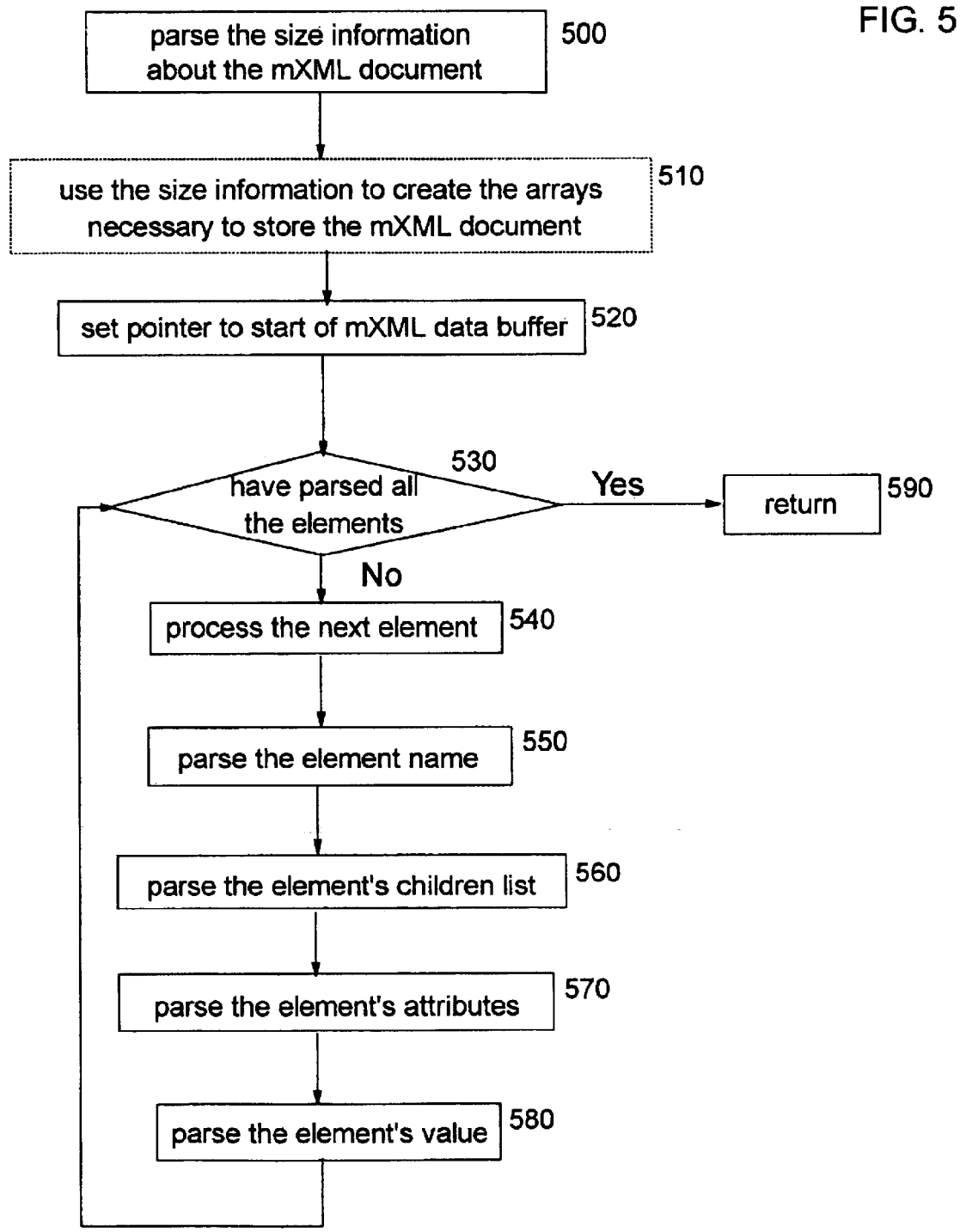
FIG. 5 provides a flowchart which sets forth a preferred embodiment of the logic which may be used to parse an mXML document, according to the present invention.

FIG. 5 provides a flowchart which sets forth a preferred embodiment of the logic which may be used to parse an mXML document which uses the preferred m L syntax, according to the present invention. This process begins at Block 500, where the size information (i.e. the number of nodes) for the document is determined by scanning the input. This size information is found as the first token of the mXML document, and will be an integer value. If the mXML document is to be stored using the array-based representation disclosed in the first related invention, then this size information is used to create arrays (as described in the specification of the first related invention) at Block 510.

Block 520 then determines where the data buffer of the mXML document begins Preferably, this comprises scanning the document in reverse order, from the end of the document content until locating the first (that is, the last-occurring) closing parenthesis (or other delimiter that may be substituted for closing a node specification, if parentheses are not used for this purpose). As is well known in the art, there may be occasions when a symbol defined for use as a delimiter needs to be used simply as a character of data. An escape character may be defined to enable representing delimiters as their normal character value. Thus, this scan preferably accounts for this situation, and locates the first non-escaped closing parenthesis. The data buffer then begins at the next-sequential position of the mXML document, as illustrated at 480 in FIG. 4C. (Accounting for escaped characters will not be further discussed with reference to FIG. 5. One of skill in the art will readily understand how this processing is to be handled.)

Alternatively, when the location of the data buffer and/or the size of the data buffer is explicitly specified in the mXML document, as discussed earlier, the processing of Block 520 comprises simply using the pre-stored information.

The test in Block 530 asks whether all the elements in the document have been parsed. This test has a positive result when the next character is not an opening node specification delimiter (i.e. an opening parenthesis, in the preferred embodiment). In this case, the parsing process of FIG. 5 is complete, and control returns to the invoking logic as shown at Block 590.

When the elements in the document have not been completely parsed, the test in Block 530 has a negative result and processing continues at Block 540. As indicated therein, the next element (that is, the next node) is to be parsed. This comprises positioning past the opening parenthesis for the node specification. Block 550 then parses the node's name from the mXML document. In the preferred embodiment syntax, this comprises reading the characters until encountering a semi-colon delimiter. These characters then represent the node's name, and may be stored or otherwise used.

Block 560 parses the node's children list. The children list begins with the character after the semi-colon delimiter which follows the node's name, and continues up to the next semi-colon delimiter. If the child list contains a comma, this indicates that there are multiple child nodes. (If desired, the node specifications of the nodes in this children list may be parsed at this point by using the child's node number from the children list to position to the child's node specification and then recursively invoking the logic in Blocks 540 through 580, where a suitable alternative "at end" test is then used in Block 530.)

Block 570 parses the node's attribute list. This attribute list follows the semi-colon delimiter used to end the children list, and continues up to the next semicolon delimiter. The names and values of these attributes may be retrieved from the data buffer, if desired, using the data buffer starting position that was determined in Block 520 along with the individual starting and length values specified as integers within the dotted notation used for the attribute list. If a comma is detected following the 4 integers in the dotted notation, this indicates the presence of an additional attribute that is then processed in the same manner.

Block 580 then locates the node's value. This comprises obtaining the starting position and length values which follow the final semi-colon delimiter in the node specification, and which are separated from one another with a comma delimiter. As with the attribute names and values in Block 570, the node value may be retrieved from the data buffer using the pointer to the data buffer along with the node name's starting and length values.

Control then returns to Block 530 to determine whether there are more node specifications to be parsed.

There are at least 2 approaches that may be used to convert an XML document to an mXML document. In a first approach, a special parser may be written for this purpose, where the parser parses the XML syntax in a similar manner to existing XML parsers and then generates a corresponding document using mXML syntax. Using the teachings disclosed herein, it will be obvious how existing XML parsing techniques may be adapted for this purpose. (For example, a parser written in the Java programming language may be written to fire an event upon detecting the beginning and end of a node, an attribute name, an attribute value, etc., where programming code is written to handle those events by creating the appropriate mXML constructs.) In a second approach, a preferred embodiment of which will now be described with reference to the logic in FIG. 6, a prior art XML parser is invoked to create a DOM tree. This DOM tree is then traversed, and the document information represented therein is then written out simply and efficiently, using mXML syntax.

Figure 6:
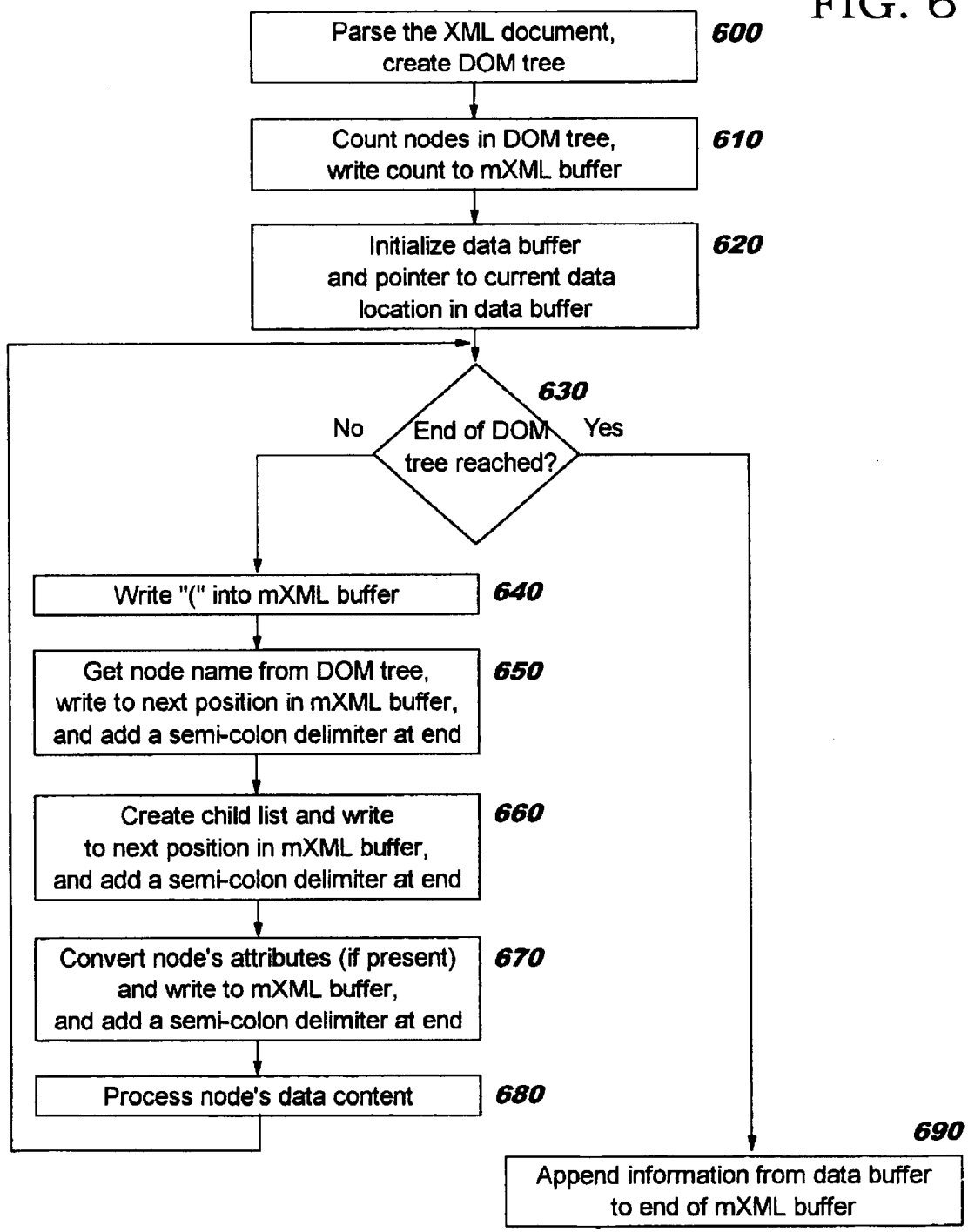
FIG. 6 provides a flowchart which sets forth the logic which may be used to convert an XML document to an mXML document, according to a preferred embodiment of the present invention.

The conversion process depicted in FIG. 6 begins at Block 600, where an XML parser of the prior art is used to parse the XML document and create a corresponding DOM tree. Block 610 then obtains a count of the nodes in this DOM tree, and writes this as an integer value into a buffer which is used to store the mXML document being created and will therefore be referred to as the "mXML buffer". A second buffer, referred to as the "data buffer", is then initialized, as is a counter that is used to point to a current location within this data buffer (Block 620).

The logic in Blocks 630 through 680 is then repeated as the DOM tree is traversed. Preferably, a depth-first traversal is used, to align with the ordering of nodes within the output mXML document as shown in FIG. 4C. Alternatively, the nodes in the output document may be created and specified therein in a breadth-first manner if desired.

While the end of the DOM tree has not been reached, the test in Block 630 has a negative result and processing therefore continues at Block 640; otherwise, control transfers to Block 690. At Block 640, the opening delimiter "(" is written into the mXML buffer to begin the node specification for the node currently being converted from XML to mXML. Block 650 then obtains the node's name from the DOM tree, and writes this into the next positions of the mXML buffer, followed by a semi-colon delimiter.

Block 660 creates the children list, and writes this to the next positions of the mXML buffer, again following the output characters with a semi-colon delimiter. If the DOM tree indicates that a node has no children, then only the delimiter is written out. Otherwise, the ordinality of the child nodes is determined, and the corresponding integer values for these nodes (preferably expressed in terms of zero-based counting) are written as a comma-separated list.

Block 670 converts the node's attribute information, if any, and writes this to the mXML buffer, followed by a semi-colon delimiter. For each attribute of the current node that is located in the DOM tree, the attribute's name and value are written to the data buffer in successive locations. The position within the data buffer where the name begins, and its length, are written to the mXML buffer as the first two dot-separated integers of the attribute specification. The data buffer counter that was initialized at Block 620 is then incremented by the length of the attribute name. Similarly, the position within the data buffer where the attribute value begins, and its length, are written to the mXML buffer using the dot-separated notation (and after a dot that follows the attribute name's length), and the data buffer counter is incremented by the length of the attribute value. If this node has more than one attribute, a comma is written to the mXML buffer to delimit the dot-separated attribute specifications.

After writing the semi-colon delimiter which marks the end of the attribute list, the node's data content is processed (Block 680). If the DOM tree indicates that the node has no data content, then a closing parenthesis delimiter is written to the mXML buffer and control returns to Block 630. Otherwise, the processing of Block 680 continues by writing the data content into the data buffer at the next available location. The starting position of this content is indicated by the current value of the data buffer counter. This value is therefore written to the mXML buffer, followed by a comma delimiter and the integer length of the content. The data buffer counter is incremented by this length, and the closing parenthesis is written to the mXML buffer. Control then transfers back to Block 630 to process the next node.

Processing reaches Block 690 when all the nodes in the DOM tree have been processed. The corresponding node specifications have been converted to mXML, and are stored in the mXML buffer. The attributes name and values, along with the data content for the nodes, are stored in the data buffer. Block 690 thus appends the information from the data buffer to the end of the mXML buffer. The mXML buffer now contains an mXML document such as that illustrated in FIG. 4C, corresponding to the input XML document such as that shown in FIG. 4A. This mXML document may now be processed, transmitted, or stored for later use as desired. (As an alternative to appending the contents of the data buffer to the mXML buffer, a pointer may be provided to convey this information. This may be useful, for example, if the conversion is performed as a prerequisite to transmitting the mXML document to another computer. In this case, the contents of the mXML buffer can be transmitted first, followed by the contents of the data buffer which are located using the pointer.)

Figure 7B:
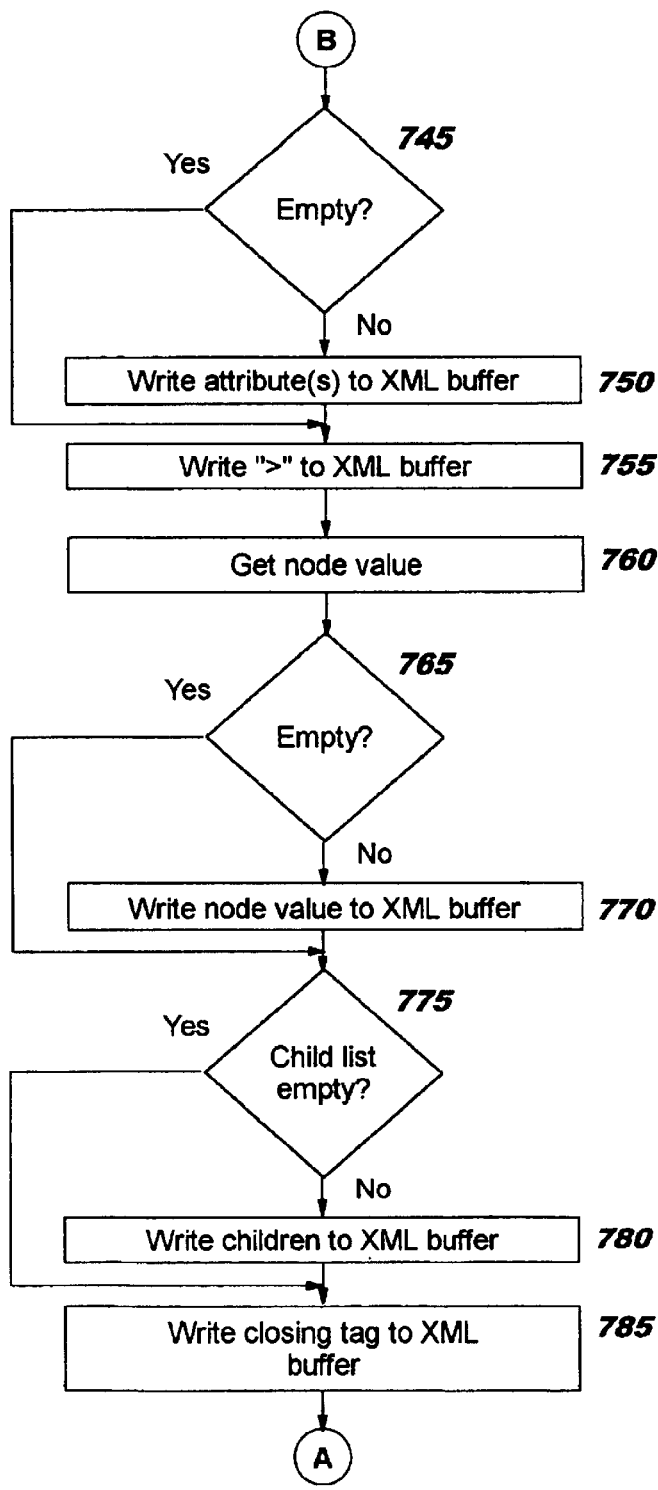
FIG. 7 provides a flowchart which sets forth the logic which may be used to convert an mXML document to an XML document, according to a preferred embodiment of the present invention.

FIG. 7 provides a flowchart which sets forth the logic which may be used to convert an mXML document to an XML document, according to a preferred embodiment of the present invention. This logic is similar to that depicted in FIG. 5. (Alternatively, an XML document may be composed by processing the mXML content represented in the array-based structure disclosed in the first related invention, and simply writing the XML document as these arrays are traversed. The manner in which this may be accomplished is straightforward, as discussed in the first related invention.)

The process of parsing an mXML document and generating its corresponding XML document begins at Block 700, by initializing a pointer to a buffer that will be used to construct the XML document and a data buffer pointer that points to the beginning of the mXML data buffer for the source document. Block 700 also initializes a node pointer that is used to keep track of which node specification is currently being processed from the source mXML document.

The logic of Blocks 705 through 785 is then iteratively performed to process the node specifications from the mXML document and create the corresponding XML representation thereof (Preferably, this logic is implemented a re-entrant code which will be recursively invoked from Block 780, as discussed below.)

Block 705 obtains the next node specification from the mXML document, which is found by scanning to the next opening parenthesis delimiter, and sets the node pointer to point to this specification. Block 710 tests to see if the processing is complete (i.e. if there are no more node specifications). When this test has a positive response, the XML document is complete and control transfers to Block 790. At Block 790, the XML document may be processed according to the needs of a particular implementation. For example, if an in-memory buffer has been used to store the converted document, the buffer contents are preferably written to a persistent storage medium. The processing of FIG. 7 then ends.

Control reaches Block 715 when there is another node specification in the mXML document to be processed. Block 715 obtains the node name from this node specification, beginning from the position following the opening parenthesis delimiter to the position preceding the first semi-colon delimiter (Block 715). Block 720 writes an opening XML tag delimiter "<" to the current position in the XML buffer, followed by this node name, and moves the XML buffer pointer accordingly (i.e. to the next position in the XML buffer).

Block 725 then obtains the children list by scanning until reaching the next-successive semi-colon delimiter. Block 730 asks whether the children list is empty. If so, control transfers to Block 740. Otherwise, the index values of the child nodes from the list in the mXML document are saved. (Alternatively, the processing of Blocks 725 through 735 may be omitted from this point in the processing by scanning directly to the attribute list after operation of Block 720. In this case, the children list is preferably obtained immediately prior to operation of Block 775, by scanning backward in the node specification, thereby avoiding the need to store the index values for later use and to perform 2 tests as to whether this list is empty.)

The attribute list is obtained from the node specification at Block 740. The list is checked (Block 745) to see if it is empty. If not, Block 750 writes the information for each attribute into the XML buffer and moves the buffer pointer.

Writing each attribute's information preferably comprises writing a blank space to follow the node name written out in Block 720. This blank space is then followed by the attribute name, where the attribute name is found using the starting position and length from the attribute list along with the data buffer pointer to index into the mXML data buffer, and then (i) an optional blank space, (ii) an equal sign, (iii) another optional blank space, and (iv) an opening quotation mark. The attribute value is then obtained from the mXML data buffer using the starting position and length from the attribute list, along with the data buffer pointer. This attribute value is then written to the XML data buffer, followed by a closing quotation mark. This process is repeated for each attribute in the attribute list (where each attribute name/value pair is preferably separated from the preceding pair using a blank space), after which processing continues at Block 755. (While the preferred embodiment is described in terms of separating output tokens in the XML document using blank spaces, it will be obvious than other separators may be used equivalently, such as multiple blank spaces and/or tab character(s) and/or line return(s).)

Block 755 writes a closing tag delimiter ">" to the XML output buffer. Block 760 then obtains the node's value information from the mXML document. If there was none, the test in Block 765 has a negative result, and the processing of Block 770 is bypassed. Otherwise, Block 770 uses the starting position and length from the node specification, along with the mXML data buffer pointer, to obtain the actual node value and writes this value to the next position(s) in the XML output buffer.

Block 775 then tests whether the previously-stored list of child nodes (from Block 735) is empty. If not, Block 780 writes the child nodes to the XML buffer. Preferably, this is performed by recursively invoking the logic of Blocks 705 through 785 for each child node, where this child node's specification is obtained at Block 705 using a simple in-order traversal through the mXML document.

Upon reaching Block 785, all children of the current node have been processed. Block 785 then writes a closing tag, which has the syntax "</" followed by the node name determined in Block 715 followed by ">", to the XML buffer. Control then returns to Block 705 to process the next node specification.

Application programs may also generate mXML documents directly, in which case a conversion such as that described herein is not required. The technique with which this document generation may be accomplished is straightforward in view of the teachings herein. Application programs generating XML output typically invoke APIs (Application Programming Interfaces) to handle elements of the XML syntax. APIs to create mXML syntax may be substituted, or may be written to intercept the existing API calls. Once the invoked code of the API creates the appropriate document objects, as is currently provided in the art, a document tree may be generated from these objects by adding a root node, attaching the children nodes to their parent nodes, and attaching any attributes to their corresponding nodes. This document tree is then preferably traversed in two phases to create an mXML document. First, the tree is traversed to (1) obtain the node count; (2) build an mXML data buffer storing the node values, attribute names, and attribute values; and (3) set a pointer to this data buffer pointer. The tree is then traversed again, writing out the structural information for each node specification using the techniques described above, followed by writing out the contents of the data buffer. The resulting mXML document may then be stored, processed, etc.

As has been demonstrated, the present invention provides a compact notation for specifying document structure and content, where this notation is a machine-friendly alternative to XML. This notation has been designed to improve the efficiency of processing structured documents, to reduce the storage requirements for structured documents, and to reduce the time required to transmit documents across networks. Studies conducted by the inventors of the present invention show that the processing time can be reduced by approximately a factor of 10 by using this alternative, machine-oriented notation instead of the XML notation of the prior art, while still conveying equivalent content and semantic information.

This machine-oriented notation may be used within a product boundary, enabling (for example) mXML documents to be shared among different processing components, transferred from one storage medium to another (such as between memory and disk), and so forth. Methods of conducting e-commerce or e-business are also facilitated when documents are encoded in mXML, as those documents may be efficiently exchanged among business partners, within different locations of an enterprise, etc.

While the preferred embodiment of the present invention has been described, additional variations and modifications in that embodiment may occur to those skilled in the art once they learn of the basic inventive concepts. In particular, the preferred embodiment may be adapted to changes in the XML notation, should they occur, and the inventive concepts disclosed herein may also be adapted for use with other notations that are syntactically similar to XML. Therefore, it is intended that the appended claims shall be construed to include both the preferred embodiment and all such variations and modifications as fall within the spirit and scope of the invention.

What is claimed is:

1. A computer program product embodied on one or more computer-readable media, the computer program product adapted for encoding a document in an extensible machine-oriented structured notation and comprising:

computer-readable program code means for encoding a node count representing a count of nodes in the document;

computer-readable program code means for encoding a node specification for each of the nodes, further comprising:

computer-readable program code means for encoding a node name;

computer-readable program code means for encoding a child list specifying index values of zero or more nodes which are children of the node;

computer-readable program code means for encoding an attribute list specifying zero or more attribute pair references for attributes of the node, each attribute pair reference comprising an attribute name and an attribute value; and computer-readable program code means for encoding a node value specification, which is empty if the node has no value;

computer-readable program code means for encoding a data buffer containing attribute names and attribute values referenced from the attribute lists and node values referenced from the node value specifications; and computer-readable program code means for storing the encoded node count, the encoded node specifications, and the encoded data buffer as the encoded document in memory or writing the encoded document to one or more storage media.

2. A computer program product embodied on one or more computer-readable media, the computer program product adapted for processing a document encoded in an extensible machine-oriented structured notation and comprising:

computer-readable program code means for parsing the document, further comprising:

computer-readable program code means for parsing a node count representing a count of nodes in the document;

computer-readable program code means for parsing a node specification for each of the nodes, further comprising:

computer-readable program code means for parsing a node name;

computer-readable program code means for parsing a child list specifying index values of zero or more nodes which are children of the node;

computer-readable program code means for parsing an attribute list specifying zero or more attribute pair references for attributes of the node, each attribute list reference comprising an attribute name and an attribute value; and computer-readable program code means for parsing a node value specification, which is empty if the node has no value; and computer-readable program code means for parsing a data buffer containing attribute names and attribute values referenced from the attribute lists and node values referenced from the node value specifications; and computer-readable program code means for using the parsed document as input for the processing.

3. A computer program product embodied on one or more computer-readable media, the computer program product adapted for converting an input document encoded in an extensible human-friendly extensible markup language ("XML") to an output document encoded in a machine-oriented extensible markup language ("mXML") and comprising:

computer-readable program code means for creating a document tree representation of the input document;

computer-readable program code means for obtaining a node count representing a count of nodes in the document tree representation;

computer-readable program code means for writing the node count to an mXML buffer;

computer-readable program code means for traversing each node in the document tree representation and generating a corresponding node specification in the mXML buffer, further comprising:

computer-readable program code means for generating a node name;

computer-readable program code means for generating an attribute list specifying zero or more attribute pair references for attributes of the node, each attribute pair reference comprising an attribute name and an attribute value;

computer-readable program code means for generating a child list specifying index values of zero or more nodes which are children of the node; and computer-readable program code means for generating a node value specification, which is empty if the node has no value;

computer-readable program code means for generating a data buffer containing attribute names and attribute values referenced from the attribute lists and node values referenced from the node value specifications; and computer-readable program code means for appending the data buffer to the mXML buffer to form the output document.

4. The computer program product according to claim 3, wherein the computer-readable program code means for generating each attribute pair reference further comprises computer-readable program code means for generating a starting name position, a name length, a starting value position, and a value length.

5. The computer program product according to claim 4, wherein the starting name position and starting value position are relative to a beginning of the data buffer.

6. The computer program product according to claim 4, wherein the starting name position and starting value position are relative to a beginning of the output document.

7. The computer program product according to claim 3, wherein the node value specification specifies a starting value position and a value length.

8. The computer program product according to claim 6, wherein the start value position is relive to a beginning of the data buffer.

9. The computer program product according to claim 6, wherein the starting value position is relative to a beginning of the output document.

10. The computer program product according to claim 3, wherein the computer-readable program code means for generating each attribute pair reference further comprises computer-readable program code means for generating a starting name position, an ending name position, a starting value position, and an ending value position.

11. The computer program product according to claim 3, wherein the node value specification specifies a starting value position and an ending value position.

12. A method for encoding a document in an extensible machine-oriented structured notation, comprising the steps of:
  encoding a node count representing a count of nodes in the document;
  encoding a node specification for each of the nodes, further comprising the steps of:
    encoding a node name;
    encoding a child list specifying index values of zero or more nodes which are children of the node;
    encoding an attribute list specifying zero or more attribute pair references for attributes of the node, each attribute pair reference comprising an attribute name and an attribute value; and
    encoding a node value specification, which is empty if the node has no value;
  encoding a data buffer containing attribute names and attribute values referenced from the attribute lists and node values referenced from the node value specifications; and
  storing the encoded node count, the encoded node specifications, and the encoded data buffer as the encoded document in memory or writing the encoded document to one or more storage media.

13. A method for processing a document encoded in an extensible machine-oriented structured notation, comprising the steps of:
  parsing the document, further comprising the steps of:
    parsing a node count representing a count of nodes in the document;
    parsing a node specification for each of the nodes, further comprising the steps of:
      parsing a node name;
      parsing a child list specifying index values of zero or more nodes which are children of the node;
      parsing an attribute list specifying zero or more attribute pair references for attributes of the node, each attribute pair reference comprising an attribute name and an attribute value; and
      parsing a node value specification, which is empty if the node has no value; and
    parsing a data buffer containing attribute names and attribute values referenced from the attribute lists and node values referenced from the node value specifications; and
  using the parsed document as input for the processing.

14. A method for converting an input document encoded in an extensible human-friendly extensible markup language ("XML") to an output document encoded in a machine-oriented extensible markup language ("mXML"), comprising the steps of:
  creating a document tree representation of the input document;
  obtaining a node count representing a count of nodes in the document tree representation;
  writing the node count to an mXML buffer;
  traversing each node in the document tree representation and generating a corresponding node specification in the mXML buffer, further comprising the steps of:
    generating a node name;
    generating an attribute list specifying zero or more attribute pair references for attributes of the node, each attribute pair reference comprising an attribute name and an attribute value;
    generating a child list specifying index values of zero or more nodes which are children of the node; and
    generating a node value specification, which is empty if the node has no value;
  generating a data buffer containing attribute names and attribute values referenced from the attribute lists and node values referenced from the node value specifications; and
  appending the data buffer to the mXML buffer to form the output document.

15. The method according to claim 14, wherein the step of generating each attribute pair reference further comprises the step of generating a starting name position, a name length, a starting value position, and a value length.

16. The method according to claim 15, wherein the starting name position and starting value position are relative to a beginning of the data buffer.

17. The method according to claim 15, wherein the starting name position and starting value position are relative to a beginning of the output document.

18. The method according to claim 14, wherein the node value specification specifies a starting value position and a value length.

19. The method according to claim 17, wherein the stating value position is relative to a beginning of the data buffer.

20. The method according to claim 17, wherein the starting value position is relative to a beginning of the output document.

21. The method according to claim 14, wherein the step of generating each attribute pair reference further comprises the step of generating a starting name position, an ending name position, a starting value position, and an ending value position.

22. The method according to claim 14, herein the node value specification specifies a starting value position and an ending value position.

23. A method for encoding a document in an extensible machine-oriented structured notation, comprising the steps of:
  encoding a node count representing a count of nodes in the document;
  encoding a node specification for each of the nodes, further comprising the steps of:
    encoding a node name;
    encoding a child list specifying index values of zero or more nodes which are children of the node; and
    encoding a node value specification, which is empty if the node has no value;
  encoding a data buffer containing node values referenced from the node value specifications; and
  storing the encoded node count, the encoded node specifications, and the encoded data buffer as the encoded document in memory or writing the encoded document to one or more storage media.

* * * * *

UNITED STATES PATENT AND TRADEMARK OFFICE
CERTIFICATE OF CORRECTION

PATENT NO. : 6,904,562 B1
DATED : June 7, 2005
INVENTOR(S) : Hind et al.

It is certified that error appears in the above-identified patent and that said Letters Patent is hereby corrected as shown below:

Title page,
Item [57], ABSTRACT, replace with the following:

Methods, systems and computer program products provide a machine oriented notation for representation and interchange of extensible documents. A document encoded in this notation resides on one or more computer-readable media and includes a node count representing a count of nodes in the document, a node specification for each of the nodes and a data buffer containing attribute names and attribute values referenced from attribute lists (when present) and node values referenced from node value specifications. Each of the node specifications include a node name, a child list specifying index values of zero or more which are children of the node, optionally, an attribute list specifying zero or more (attribute name, attribute value) pair references for attributes of the node, and a node value specification, which is empty if the node has no value.

Column 10,
Line 10, should read -- frequently can be minimized --.

Column 20,
Line 57, should read -- wherein the start value position is relative to a beginning of the --.

Column 22,
Line 31, should read -- 19. The method according to claim 17, wherein the starting --.
Line 41, should read -- 22. The method according to claim 14, wherein the node --.

Signed and Sealed this

Fourteenth Day of February, 2006

JON W. DUDAS
*Director of the United States Patent and Trademark Office*